US008951670B2

(12) United States Patent
Alarco et al.

(10) Patent No.: US 8,951,670 B2
(45) Date of Patent: Feb. 10, 2015

(54) ADHESION OF ACTIVE ELECTRODE MATERIALS TO METAL ELECTRODE SUBSTRATES

(75) Inventors: Jose Antonio Alarco, Kenmore (AU); John Louis Bradley, The Gap (AU); Mark Ronald Quinlan, Forest Lake (AU); Peter Cade Talbot, Chapel Hill (AU)

(73) Assignee: Very Small Particle Company Limited, Wacol, Queensland (AU)

( * ) Notice: Subject to any disclaimer, the term of this patent is extended or adjusted under 35 U.S.C. 154(b) by 0 days.

(21) Appl. No.: 13/805,331

(22) PCT Filed: Jun. 30, 2011

(86) PCT No.: PCT/AU2011/000812
§ 371 (c)(1),
(2), (4) Date: Feb. 1, 2013

(87) PCT Pub. No.: WO2012/000041
PCT Pub. Date: Jan. 5, 2012

(65) Prior Publication Data
US 2013/0130108 A1    May 23, 2013

(30) Foreign Application Priority Data
Jun. 30, 2010    (AU) ................................ 2010902901

(51) Int. Cl.
| H01M 4/13 | (2010.01) |
| H01M 4/62 | (2006.01) |
| H01M 4/04 | (2006.01) |
| H01M 4/131 | (2010.01) |
| H01M 4/133 | (2010.01) |
| H01M 4/139 | (2010.01) |

(52) U.S. Cl.
CPC ............ *H01M 4/621* (2013.01); *H01M 4/0404* (2013.01); *H01M 4/0435* (2013.01); *H01M 4/131* (2013.01); *H01M 4/133* (2013.01); *H01M 4/139* (2013.01); *Y02E 60/122* (2013.01)
USPC ....... 429/212; 429/213; 429/217; 429/231.95

(58) Field of Classification Search
CPC . H01M 4/0404; H01M 4/0435; H01M 4/131; H01M 4/133; H01M 4/139; H01M 4/621; Y02E 60/122
USPC .............................. 429/212, 213, 217, 231.95
See application file for complete search history.

(56) References Cited

U.S. PATENT DOCUMENTS

| 5,399,447 A | 3/1995 | Chaloner-Gill et al. |
| 2004/0137332 A1 | 7/2004 | Noh et al. |
| 2004/0234858 A1 | 11/2004 | Torimae et al. |
| 2005/0277023 A1* | 12/2005 | Marple et al. .................. 429/221 |
| 2006/0024579 A1 | 2/2006 | Kolosnitsyn et al. |
| 2006/0153972 A1 | 7/2006 | Hirokawa |
| 2008/0020284 A1* | 1/2008 | Michot et al. .................. 429/325 |
| 2009/0068566 A1 | 3/2009 | Park et al. |
| 2009/0155689 A1 | 6/2009 | Zaghib et al. |
| 2009/0253036 A1* | 10/2009 | Owen et al. .................... 429/207 |
| 2009/0263718 A1 | 10/2009 | Higashizaki et al. |

FOREIGN PATENT DOCUMENTS

WO    WO00/49103    8/2000

OTHER PUBLICATIONS

International Search Report and Written Opinion, PCT/AU2011/000812, mailed Aug. 5, 2011.

* cited by examiner

*Primary Examiner* — Patrick Ryan
*Assistant Examiner* — Ben Lewis
(74) *Attorney, Agent, or Firm* — Winston & Strawn LLP

(57) ABSTRACT

A battery electrode for a lithium ion battery that includes an electrically conductive substrate having an electrode layer applied thereto. The electrode layer includes an organic material having high alkalinity, or an organic material which can be dissolved in organic solvents, or an organic material having an imide group(s) and aminoacetal group(s), or an organic material that chelates with or bonds with a metal substrate or that chelates with or bonds with an active material in the electrode layer. The organic material may be guanidine carbonate.

14 Claims, 6 Drawing Sheets

ADHESION OF ACTIVE ELECTRODE MATERIALS TO METAL ELECTRODE SUBSTRATES

FIELD OF INVENTION

The present invention relates to method for achieving improved adhesion of active cathode and anode materials to metal substrates, particularly those used in lithium-ion secondary batteries.

BACKGROUND

High performance lithium-ion secondary batteries that exhibit high energy density, fast charge/discharge cycles and long cycle life have become increasingly important for the rapid development of the hybrid and electric vehicle industry. In addition, large format lithium-ion batteries look set to also play an important role in energy storage for renewable and off-peak electricity generation.

Lithium ion secondary batteries typically comprise two electrodes (a cathode and an anode) having a porous separator and liquid electrolyte material positioned between the two electrodes. At least one of the electrodes, typically the cathode, comprises a metal substrate (which acts as a current collector) and an electrode material applied by coating to the metal substrate. The cathode electrode material typically comprises a mixture of a lithium-containing compound that provides a lithium ion source in the battery, a binder, a solvent and conductive particulate material. The anode material typically comprises a carbon or graphitic type compound that intercalates lithium and a binder, a solvent and conductive particulate material. Aluminium metal is usually the substrate for the cathode material. Copper metal is usually the substrate for the anode material.

The lithium containing compound in the electrode material may be, for example, a lithium iron phosphate material (LFP), $LiMXO_4$ (M: Fe, Mn, Co, Ni, etc and mixtures of these elements; X: P, Si, Si, V, etc and mixtures of these elements), $Li_2FePO_4F$, $LiCoO_2$, $LiCo_{1/3}Ni_{1/3}Mn_{1/3}O_2$, $LiMn_2O_4$, $Li_2MnO_3$—$LiMO_2$ (M: Mn, Ni, Co), $Li_2SO_4$, lithium vanadium oxides, lithium vanadium phosphates, lithium titanates, other lithium ion intercalating compounds and/or mixtures and composites of any of the aforementioned materials. The lithium containing compound in the electrode material can provide lithium ions to the electrolyte and receive lithium ions from the electrolyte during charging and discharging cycles.

Although the lithium containing compounds allow for higher electrical energy density during discharge and also allow for a large number of charging cycles, they suffer from the drawback that they have relatively low electrical conductivity. To overcome this difficulty, the electrode material is typically provided with conductive particulate material, such as electrically conductive carbon black. The carbon black provides increased electrical conductivity to the coating. In other electrode coatings, the lithium containing compound (which is typically in the form of solid particles) may be coated with a graphite layer to provide increased electrical conductivity.

Manufacturing of electrodes for lithium batteries typically involves coating the metal substrate with a layer of the electrode material. Manufacturing techniques have developed to rapidly apply a coating of the electrode material. These techniques require that the coating include a solvent. A solvent that is commonly used is N-Methyl-2-pyrrolidone (NMP). A binder, which is normally polyvinylidene fluoride (PVDF), is also included.

In order to form the electrode, it is common to provide the electrode material in the form of an ink or a liquid composition that can be applied to the metal substrate using technology similar to printing technology. After the coating of the electrode material has been applied to the substrate, the coating is subjected to a calendaring process to press and heat the coating, which increases the density of the coating.

Two aspects central to achieving high performance in these batteries is good internal ionic and electrical conductivity. In the case of electronic conductivity it is essential to have low impedance at the interface between the active cathode material and the metal electrode substrate. This is achieved by ensuring complete adhesion of the cathode to the metal substrate.

Adhesion between a coating and a substrate is usually achieved through one or more of the three following mechanisms:
  Surface roughness;
  Chemical bonding; and/or
  Interface reaction or compound.

With surface roughness, although the compounds that make up the substrate and the coating do not necessarily establish a chemical bond, the mechanical interlocking of their rough interface guarantees a good contact between the coating and the substrate.

With chemical bonding, the coating must contain ingredients or components that are capable of establishing molecular bonds to the substrate. This would ideally be the case, for instance, with most binders that are used in the battery cathode ink formulation.

Through an interface reaction, one (or more) new compound(s) is typically formed at the interface and this compound is likely to acquire the features that facilitate either one or both of the previous two mechanisms of adhesion—surface roughness and chemical bonding.

In the case of lithium-ion secondary batteries significant problems have arisen in achieving good adhesion at this interface between the electrode material and the metal substrate. Coated electrodes of this type need to maintain their conductivity while still being flexible enough to be wound or rolled into final battery shapes. As a result, lithium containing cathode materials are mixed with binders, conducting carbon particles and solvent to produce an ink that can be cast onto a continuous roll of metal foil, such as aluminium, that can be later cut into appropriate lengths and wound with other components to produce the battery. Furthermore, when good adhesion is achieved between the cathode and the collector substrate, it is possible to exert higher pressures during the process step known as calendering. Such additional pressure will in turn improve the electrical contact between particles, and also, enhance the packing density, both of which are desirable for enhanced performance. FIG. 1 shows the gradual reduction in resistance of pressed pellets of plain LFP powder without additional particulate Super P (Super P is the trade name of a carbon black material commonly used in lithium battery manufacture) or binder. As the contact between particles increases, so does the conductivity.

As mentioned above, a typical cathode ink composition may contain a lithium metal oxide, as the lithium-ion source, polyvinylidene fluoride (PVDF) or PVDF copolymer resins as the binder, N-Methyl-2-pyrrolidone (NMP) as the binder solvent and carbon black as a conductive particle source. Factors such as surface charges, reactions between components and final ink pH can result in a mix that has little or no adhesion with metal electrode substrates. In particular, a good mixing and distribution of the particulate conducting carbon needs to be obtained in order to ensure good electrical contact across the entire area and thickness of the cathode coating.

Aluminium, which is usually the substrate for the cathode material, is known to have a nanometer scale oxide surface layer. Caustic solutions and very acid solutions dissolve the oxide layer, however, the speed of re-oxidation after exposure in air at room temperature is known to be very fast, of the order of microseconds, for the re-establishment of the first few nanometers of the aluminium oxide coating. Such oxide layer is expected to change the surface properties of the substrate and to provide some degree of electrical insulating contribution.

Cleaning the aluminium substrate with caustic and acidic solution to remove the aluminium oxide layer from the surface of the substrate is possible. However, it is unlikely that such a step will be a viable processing step in electrode manufacture, not only because it introduces additional steps, but primarily because the aforementioned oxide layers will re-form quickly, prior to the final coating step with the electrode material. In addition, KOH is known to react exothermically and somewhat violently with aluminium, with generation of hydrogen gas. Thus, it would be difficult to implement on a large scale.

Finally in order to achieve good adhesion, in addition to introducing one of the aforementioned adhesion mechanisms, a good mixing and distribution of the particulate conductive material, such as conducting carbon, needs to be obtained in order to ensure good electrical contact across the entire area and thickness of the coating.

A number of approaches have been used in an attempt to overcome this adhesion problem. These approaches include pre-coating the metal electrode with an interface layer, pre-treating the metal surface using pickling solutions to enhance surface roughness and adding functional groups that enhance cross linking of monomers with PVDF copolymers binders.

A number of efforts, from prior art, to improve the coating of electrode materials on to metal substrates for use in production of batteries are listed below.

United States patent application US 2009/0263718A1 discloses the addition of two different size ranges of particulate conductive carbon (one with average particle diameter of from 3 to 10 micron and another with average particle diameter of 1 micron or less) is useful to improve the cohesiveness in the pressing stage and assists to prevent defects such as detachment from occurring.

United States patent application US 2009/0155689A1 discloses the use of multimodal particle size distribution in the $LiMPO_4$ (M: Fe or Mn) active cathode material comprising at least one fraction of micron size particles and at least one fraction of submicron size particles in order to enhance packing density and optimise porosity. Two different processes are in general used to obtain the materials with different particle size distribution. Although the focus is to enhance energy density and power performance, improvements in cohesiveness similar to those of patent application US 2009/02673718A1 may be expected.

United States patent application US 2004/0234858A1 discloses that when a surface roughness of at least 0.1 micron in the current collector is used, adhesion between the mixed layer and the collector is greatly improved.

U.S. Pat. No. 5,399,447 discloses a method to reduce the acidity of an adhesion promoter layer made of carbon and polyacrylic acid by treating this layer with LiOH. Otherwise, there is the risk of H+ ions taking the place of Li+ ions in the cathode material, thereby reducing the capacity of the battery.

International Patent application WO 00/49103 describes a method for the adhesion of vinylidene fluoride resins to metal substrates which is characterized in that, when sticking a polyvinylidene fluoride to a metal substrate, there are added to and mixed with vinylidene fluoride resin (a) at least one type of polymer (b) selected from acrylic and methacrylic polymers or resins containing such polymers and at least one organic compound (c) selected from the mercapto, thioether, carboxylic acid and carboxylic anhydride groups.

A method of manufacturing electrodes for electrochemical devices is disclosed in United States patent application US 2006/0153972A1. In this patent, adhesion is attributable to an electrically conductive adhesive produced by mixing a particulate rubber and particulate conducting carbon. The role of too little or too much rubber in proportion to carbon is emphasized.

Although the prior art mentioned above teaches ways to improve adhesion, most of these methods introduce additional processing steps in the manufacture of the battery cathodes adding to the complexity and cost. Most battery manufacturers are reluctant to alter their manufacturing practices significantly. Therefore, it is desirable to provide for enhanced adhesion of the electrode material to the metal substrate without requiring the introduction of additional steps to the electrode manufacturing process. Desirably, enhanced adhesion of the electrode material should be obtained without requiring any other changes in the coating manufacturing steps and without any collector/substrate pre-treatment in the lithium-ion secondary battery manufacturing industry, in particular, for powders with various particles characteristics and morphologies.

Throughout this specification, the term "comprising" and its grammatical equivalents shall be taken to have an inclusive meaning unless the context of use indicates otherwise.

The applicant does not concede that the prior art discussed in this specification forms part of the common general knowledge in Australia or elsewhere.

SUMMARY OF THE INVENTION

In a first aspect, the present invention provides a composition for forming a battery electrode for a lithium ion battery, the composition comprising:
  a lithium containing compound that provides a lithium ion source in the battery;
  a binder;
  a solvent;
  a conductive particulate material; and
  an organic material having high alkalinity.

In some aspects, the organic material may be dissolved in an organic solvent. Accordingly, in a second aspect, the present invention provides a composition for forming a battery electrode for a lithium ion battery, the composition comprising:
  a lithium containing compound that provides a lithium ion source in the battery;
  a binder;
  a solvent;
  a conductive particulate material; and
  an organic material having high alkalinity which can be dissolved in organic solvents In a third aspect, the present invention provides a composition for forming a battery electrode for a lithium ion battery, the composition comprising:
  a lithium containing compound that provides a lithium ion source in the battery;

a binder;
a solvent;
a conductive particulate material; and
an organic material having imide group(s) and aminoacetal group(s).

In a fourth aspect, the present invention provides a composition for forming a battery electrode for a lithium ion battery, the composition comprising:
a lithium containing compound that provides a lithium ion source in the battery;
a binder;
a solvent;
a conductive particulate material; and
an organic material that chelates or bonds with a metal substrate and/or with an active ingredient in the electrode layer. The active ingredient that the organic compound may chelate with or bond with may comprise the conductive particulate material. The conductive particulate material may be a carbonaceous material. In embodiments where the organic material chelates with the metal substrate or with the active ingredient, the organic material may strongly chelate with the metal substrate or with the active ingredient.

In a fifth aspect, the present invention provides a composition for forming a battery electrode for a lithium ion battery, the composition comprising:
a graphitic type compound that intercalates lithium,
a binder;
a solvent;
a conductive particulate material; and
an organic material that chelates or bonds with a metal substrate and/or with the conductive particulate material. The conductive particulate material may be a carbonaceous material. In embodiments where the organic material chelates with the metal substrate or with the conductive particulate material, the organic material may strongly chelate with the metal substrate or with the conductive particulate material.

The composition of the first aspect, second aspect, third aspect, fourth aspect and fifth aspect of the present invention may further comprise water. Water may be present in an amount sufficient to dissolve the organic material. Desirably, water is present in the minimum amount required to dissolve the organic material in order to minimise the amount of water introduced into the composition.

The organic material may include a carbonate ion or a carbonate species.

The organic material may have high alkalinity and also chelate or bond with a metal substrate and/or with an active ingredient in the electrode layer.

The organic material may comprise a guanidine compound. Guanidine $(NHC(NH_2)_2)$ includes an imide group and aminal or aminoacetal groups. The organic material may comprise guanidine carbonate. Guanidine carbonate has the formula $(NHC(NH_2)_2)CO3(NHC(NH_2)_2)$. It is highly alkaline, exhibiting a pH of 11 to 12 when prepared as a 5% solution in water. It has a solubility in water of approximately 40 to 45 g per 100 g of water.

The organic material may have high alkalinity when dissolved in water. In some embodiments, the organic compound exhibits a pH of at least 8 when dissolved as a 1M solution in water, more preferably a pH of at least 9, more preferably a pH of at least 9.3, even more preferably a pH of at least 10, or at least 11 or at least 12, when dissolved as a 1M solution in water. In other embodiments, the organic compound exhibits a pH of at least 8 when dissolved in water, such as when dissolved in water as a 5% by weight solution in water, more preferably a pH of at least 9, more preferably a pH of at least 9.3, even more preferably a pH of at least 10, or at least 11 or at least 12, when dissolved in water, such as when dissolved in water as a 5% by weight solution in water.

Other organic materials, with high alkalinity and chelating properties may include ethylenediamine, trymine, trymidine, histidine, aminoacetic acid, ammonia, N-butylamine, methylamine, piperidine, triethylamine, diethanolamine, EDTA, etc. It may also be possible to combine two compounds where one supplies the high alkalinity and the other provides the strong chelating properties.

In a sixth aspect, the present invention provides a method for forming an electrode for use in a lithium ion battery, the method comprising the steps of providing a metal substrate and applying a coating of electrode material to the metal substrate, wherein the coating of electrode material applied to the metal substrate comprises a composition as described with reference to the first aspect of the present invention, the second aspect of the present invention, the third aspect of the present invention, the fourth aspect of the present invention or the fifth aspect of the present invention.

The organic material may be at least partly dissolved in water at the time of applying the coating to the metal substrate.

The metal substrate may comprise an aluminium substrate or a copper substrate.

The metal substrate may comprise aluminium or an aluminium alloy. The metal substrate may comprise aluminium foil or a foil made from an aluminium alloy. The metal substrate may also comprise copper or a copper alloy. The metal substrate may comprise copper foil or a foil made from a copper alloy.

The electrode coating may be applied to the metal substrate by spraying or by printing.

The method may further comprise the step of subjecting the coated metal substrate to a calendering step to increase the density of the electrode material coating. The calendering step may comprise pressing or rolling, optionally with heating.

In a seventh aspect, the present invention provides a lithium battery comprising a first electrode, a second electrode and an electrolyte containing a lithium compound, wherein at least one of the electrodes comprises a metal substrate having an electrode material coated thereon, the electrode material comprising a coating formed from a composition as defined in any of the first aspect of the present invention, the second aspect of the present invention, the third aspect of the present invention, the fourth aspect of the present invention or the fifth aspect of the present invention.

The present inventors have found that there is typically a minimum amount of organic material that must be added to the composition in order to obtain good adhesion on the substrate. It is expected that a minimum amount of about 1% by weight of the organic material will be required to obtain good adhesion, typically at least 1.5% by weight or even at least 1.8% by weight, or even at least 2% by weight. If the organic material is present in the composition as a solution, it is possible to use a smaller amount to obtain good adhesion than if the organic material is present in the composition as a solid. However, good adhesion can still be obtained when the organic material is present in the composition as a solid. The percentage of organic material added is expressed as a weight percentage of the weight of the electrode material/composition.

The composition of the present invention may be used on a cathode or on an anode. The battery electrode in accordance with embodiments of the present invention may be a cathode or an anode.

In another aspect, the present invention provides a battery electrode for a lithium ion battery comprising an electrically conductive substrate having an electrode layer applied thereto, characterised in that the electrode layer includes an organic material having high alkalinity, or an organic material which can be dissolved in organic solvents, or an organic material having an imide group(s) and aminoacetal group(s), or an organic material that strongly chelates or bonds with a metal substrate and/or chelates or bonds with an active material in the electrode layer, such as the conductive particulate material (which may be a carbonaceous material).

In all aspects of the present invention, the organic material may comprise an organic compound (such as a single organic compound) or two or more organic compounds.

It has also been found that it might not be necessary to mix the organic material in with the other materials for the electrode layer prior to applying the electrode materials to the electrode layer. In particular, satisfactory adhesion has also been achieved by applying the organic material to a substrate (for example, by spraying or brushing or wiping) and subsequently applying the electrode layer to the substrate. In another aspect, the present invention provides a method for forming an electrode for a lithium ion battery comprising the steps of applying to a substrate an organic material having high alkalinity, or an organic material which can be dissolved in organic solvents, or an organic material having an imide group(s) and aminoacetal group(s), or an organic material that strongly chelates with a metal substrate, and subsequently applying an electrode material to the substrate. In this aspect, the composition that is applied to the substrate may be thought of as including the organic material and the other electrode materials, but with the composition applied in two different steps.

In all aspects of the present invention, it may be preferable that the organic material does not have counter-ions, such as Na or K, which induce unwanted reaction with aluminium or the electrolyte.

Throughout this specification, the term "composition" is used to refer to an intimate mixture of the components of the composition as well as to the components of the composition being present in two or more regions, layers or volumes, with intermixing at the edges, or to a composition showing a stratified composition.

Throughout this specification, the composition may be applied to a substrate by applying an intimate mixture of all the components of the composition to the substrate or by applying one or more components to the substrate followed by sequential application of one or more components, or by applying the organic material (in solid form, in organic solution form or in aqueous solution form) to the substrate, followed by application of one or more other components in a single further step or in two or more further application steps.

DETAILED DESCRIPTION OF THE INVENTION

Figure 1:
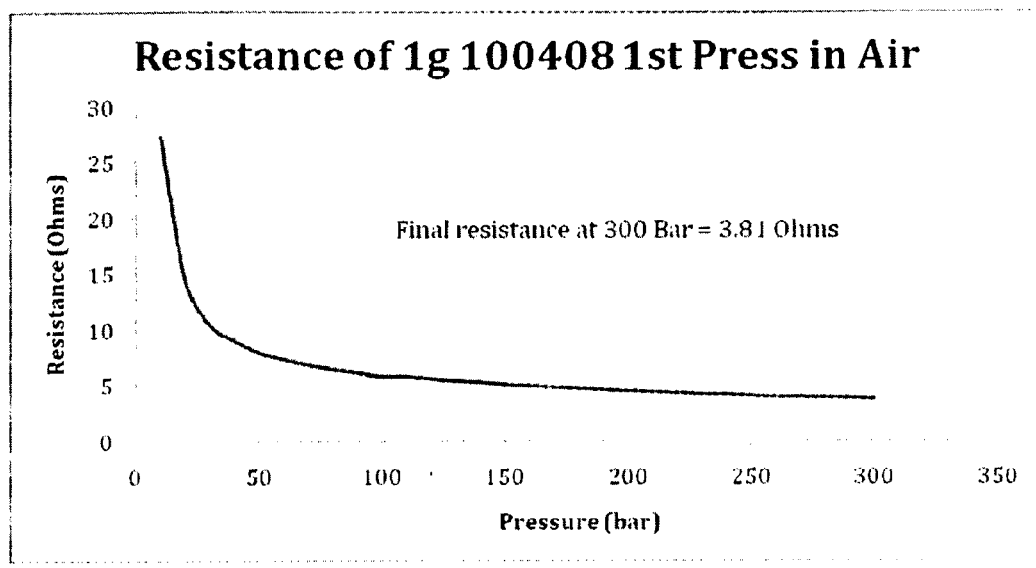
FIG. 1 shows a graph of electrical resistance of pressed pellets of plain LFP powder vs pressure, which demonstrates a gradual reduction of resistance with increased pressure.

Preferred embodiments of the present invention will now be described.

In the following description, reference to "good adhesion" is to be taken to mean that the coating shows no sign of detachment of the battery cathode coating from the aluminium substrate after the hard press rolling or calendering.

In experimental work conducted by the present inventors, guanidine carbonate was used as the organic material that was added to the electrode material composition. Adding guanidine carbonate was found to significantly enhance the adhesion of the electrode material to the aluminium substrate without adversely affecting the electrical properties of the electrode material. Furthermore, the coating was achieved by simply adding guanidine carbonate, typically in the form of an aqueous solution of guanidine carbonate, to the electrode material composition that was being applied to the aluminium substrate. Therefore, no additional processing steps (beyond adding the solution of guanidine carbonate) are required to form the electrodes.

Guanidine carbonate is a very unique organic carbonate. It is one of the strongest alkaline compounds, which translates into smaller amounts required to obtain a given high pH.

Surprisingly, the present inventors have found that addition of a small amount of guanidine carbonate dissolved in water (for example, 1.6 wt % of the standard paste) to the standard cathode paste formulation enhanced the adhesion and produced smooth surfaces after hard pressing. Surprisingly, addition of dry guanidine carbonate did not work at lower levels of guanidine carbonate addition.

Without wishing to be limited by theory, the present inventors believe that guanidine carbonate is playing multiple roles. The high alkalinity of guanidine carbonate would result in some degree of locally exothermic interface reaction and dissolution of the aluminium oxide surface layer present on the aluminium substrate, likely creating surface roughness on the aluminium substrate. In addition, by cleaning the oxide layer (which is electrically insulating by nature) in-situ and during the process of coating the electrode material onto the substrate, the electrical connection between the cathode material and the aluminium current collector would be enhanced.

Other highly alkaline organic compounds would be expected to work similarly to guanidine carbonate with respect to generating surface roughness, although higher concentrations are likely to be required if those other highly alkaline organic compounds have a lower alkalinity than guanidine carbonate. Some very acidic solutions would be expected to work too, although one of the abovementioned prior art documents teaches against the use of acids because H+ ions compete for space with Li+ ions.

In general, care must be taken that whatever the compound or compounds chosen to do a job equivalent to guanidine carbonate, it does not have other unwanted side reaction with the substrate or the electrolyte. The electrolyte is typically $LiPF_6$ salt dissolved in a mixture of Diethyl carbonate (DEC), Ethylene carbonate (EC) and/or propylene carbonate (PC). Without limitation by theory, the fact that these carbonates are already present in the electrolyte appears to indicate a possible compatibility of guanidine carbonate with the electrolyte.

Another characteristic of guanidine carbonate that may be contributing to a strong adhesion is that guanidine carbonate has strong chelating properties with metals, which may allow it to bond strongly with aluminium and iron in the substrate and the LFP particles, respectively.

Due to the chelating property of guanidine carbonate and the presence of carbonate, some affinity to the carbon particles leading to their functionalization and allowing a more homogeneous mixing is also feasible. Monarch 1300, which is a functionalized particulate carbon that has been surface treated with acid, leads to good adhesion. Unfortunately it is not as good an electrical conductor as Super P Li (which is another carbon black material that is commonly used in the manufacture of electrodes for lithium ion batteries). Super P Li carbon black is specially optimized for Lithium ion battery applications and hence battery manufacturers frequently use this carbon black material.

In another embodiment of the invention, addition of a small amount of LiOH dissolved in water to the standard cathode paste was found to enhance adhesion, although migration of Li during electrochemical testing may undo the benefit of the good adhesion. For very similar reasons, it is, in general, preferable to avoid the presence of counter-ions such as Na and K, which may induce other unwanted reaction with aluminium or the electrolyte. Accordingly, in another aspect, the organic material suitably does not have counter-ions which induce unwanted reaction with aluminium or the electrolyte.

In summary, and again without wishing to be bound by theory, guanidine carbonate appears to play simultaneous roles, each of which enhances the adhesion of the cathode material paste to the aluminium substrate (or the anode material paste to the copper substrate, respectively). Adhesion enhancement mechanisms obtained with very small amounts of guanidine carbonate could possibly include cleaning of the oxide surface layer of aluminium (or copper), roughening of the interface, chemical bonding to the cathode (or anode) material particles and to the substrate and probably functionalization of the carbon additive particles as well.

Spherical particles would in general be expected to require significantly more binder than flat particles, since the contact would be more point like for the spherical particle. However, if a simple method, such as the one provided in this invention, is established for good adhesion of spherical particles, without requiring any extra binder, it could potentially become the method of choice to optimize in a controlled fashion the packing density and porosity of coated cathode materials by appropriate selection of particle size distributions.

EXAMPLES

In the following examples, a battery cathode is manufactured by applying a coating of the electrode material to an aluminium substrate.

Example 1

Preparation of Cathode Paste Formulation—Using Guanidine Carbonate

For a 10 g target (LFP+PVDF+Super P Li) of a 90:5:5 (LFP:PVDF:Super P Li) electrode mix, the following table gives the relative quantities of the ingredients:

| | |
|---|---|
| PVDF | 0.50 g |
| NMP | 24 g |
| 1M Guanidine carbonate solution | 23 drops* |
| Super P Li | 0.50 g |
| LFP powder | 9.00 g |

*4 drops weigh 0.1 g

Procedure:

Make up a stock 1M Guanidine carbonate (GC) solution by dissolving 18 g GC and adding reverse osmosis (RO) water up to a volume of 100 ml in a volumetric flask. A GC solution close to 1M can be obtained by dissolving 18 g of GC in 88.66 g of RO water. The resulting pH is around 11.5.

Weigh out the PVDF and then add the proper amount of NMP.

Using the High Speed Mixer (HSM) whiz this mixture until PVDF has dissolved into NMP.

Add the 1M Guanidine carbonate solution drops and blend with Ultra Turrax (UT), setting 1, or equivalent dispersion equipment, until dispersed Weigh out Super P Li carbon black and add this to the PVDF/NMP/GC solution. Continue HSM until mixture is a smooth paste (approx 5 min).

Weigh out the active material (e.g. $LiFePO_4$ or other lithium containing material) and using a mortar and pestle, gently grind the material for a few minutes to ensure there are no large agglomerates in powder.

Add this powder to the Super P/PVDF/NMP/GC mix. Gently mix using a planar mixer for at least 1 hour, ensuring that all the material is well mixed.

Example 2

Preparation of Cathode Paste Formulation—Adding Guanidine Carbonate after Completing the Regular Paste Mix A similar paste formulation procedure to that described in example 1 is followed with the only difference that GC solution is added later. After a uniform paste without GC has been prepared, the correct amount of GC solution is added and mixed thoroughly. The amount of GC is aimed at the same proportions of example 1 and it can be determined according to the following proportions:

Weigh 6 g of Super P/PVDF/NMP/Active Material mixture into small beaker (50 ml beaker).

Add 0.1 g of 1M GC (4 drops) and mix well.

Follow Electrode coating procedure (using bare Al foil) to complete cathode using this mixture.

Figure 2:
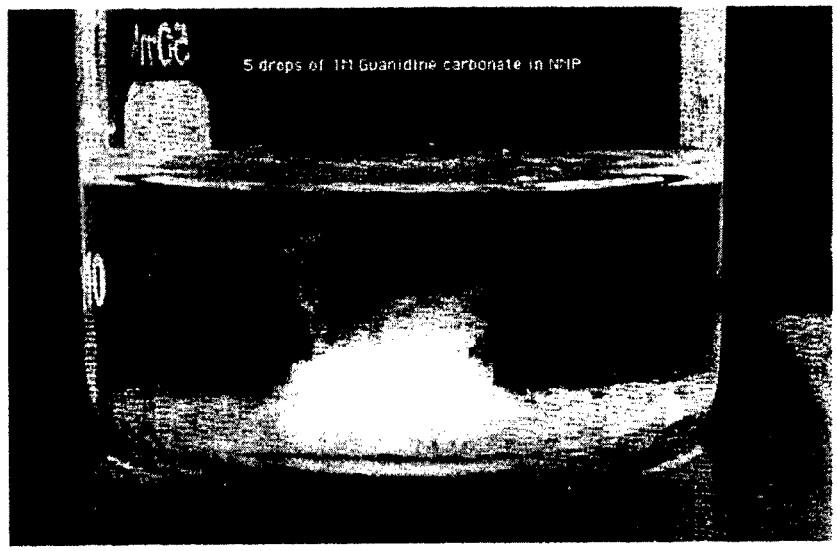
FIG. 2 shows a photograph of a GC solution placed in contact with NMP. The GC displays an immediate very fine precipitation.

In this case the coating displays good adhesion, but the coating usually has slightly less smooth surface than the coating arising from the composition of example 1, depending on the degree of mixing and homogeneity of the guanidine carbonate (GC) additive. Drops of GC solution when in contact with NMP display immediate very fine precipitation (see FIG. 2). This fine precipitate would appear easier to distribute homogeneously in the process described in example 1.

Example 3

Electrode Coating

Figure 3:
FIG. 3 shows a photograph of the apparatus used to coat the electrode material composition onto the aluminium substrate, as described in Example 3.

The following procedure was followed to coat an electrode with the electrode coating composition. FIG. 3 shows a photograph of the apparatus used to coat the electrode material composition onto the aluminium substrate:

Cut a strip of aluminium foil to the appropriate size.

Squirt a small amount of water/acetone onto a glass plate and lay the aluminium strip on top of it. Adhere the strip to the glass plate by squeezing out the excess water/acetone from underneath with a folded paper towel. Smooth the edges of the Al strips with the cap of a pen.

Set the micrometers on the graded doctor blade to 25 microns. Place a sufficient amount of electrode paste onto the Al foil; place the doctor blade in front of it, and with a steady continuous movement spread the coating all the way along the strip.

Carefully transfer the strip onto a glass tray and place weights on either end to ensure foil does not curl whilst drying.

Place in oven at 150° C. in air for at least 1 hour.

Using a calendaring (roller press) machine press electrodes. Once the electrodes have been pressed, use the steel disc from the battery cell as a template to cut out electrode disks. The weight and height of each disc needs to be measured and recorded.

Place the discs in the ante-chamber under vacuum at 150° C. for 48 hours prior to battery test-cell assembly inside dry atmosphere glove box.

The unassembled battery test-cell units should also be pre heated for at least 24 hours, prior to assembly. This can be done at the same time as the electrodes if possible.

Example 4

Battery Test Cell Assembly Procedure

Transfer unassembled battery test cell and electrodes from the ante-chamber into glove box.

Cut out separators using hole punch. Place in ante-chamber under vacuum at 80° C. for a minimum of 24 hrs.

In glove box, prepare anodes (lithium ribbon). Using fine sand paper, clean a strip of lithium ribbon and use a hole punch to cut out anodes.

Fill beakers with a small amount of electrolyte ($LiPF_6$ in EC/DEC). Soak the first electrode in one of the beakers for about 5 mins before following the assembly procedure below.

Figure 4:
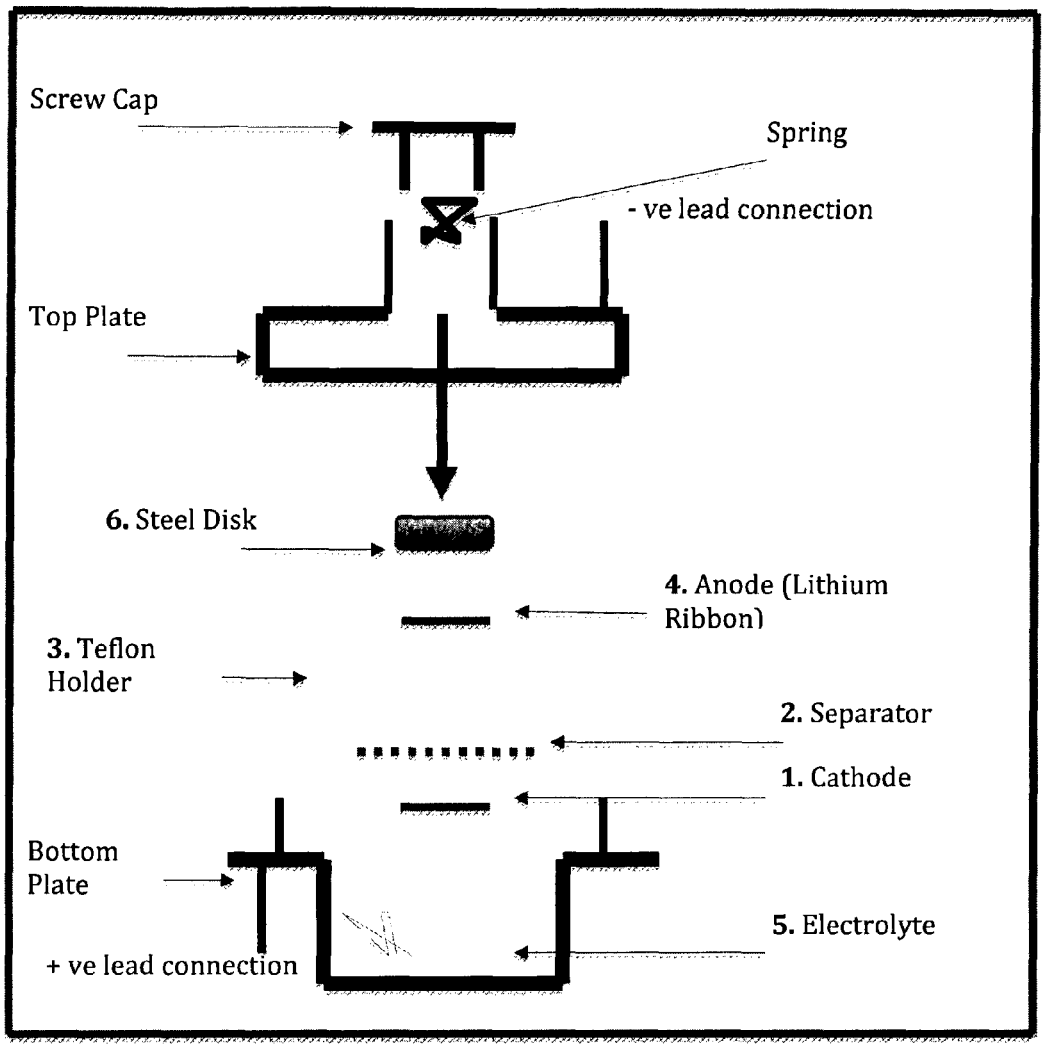
FIG. 4 schematically shows the steps involved in assembling a test cell used in Example 4.

Assemble cells (follow numbering from 1-6 first, as shown in FIG. 4) as below without screw cap.

Place soaked electrode in bottom of cell.

Soak the separator in electrolyte before placing it on top of the cathode.

Push Teflon holder into place over the spacer and cathode.

Place anode in Teflon holder, making sure that it is flush on the spacer.

Insert steel disk on top of anode and push down gently.

Using micropipette, put 200 µl of electrolyte around the outside of the Teflon holder. Use the fresh electrolyte in the second beaker.

Place top plate on cell and tighten wing nuts.

Leave screw caps off for time being and assemble remaining cells.

Once all cells have been assembled, wait 1 hr.

Connect positive and negative leads to battery cells and tighten screw caps.

Calculate current for desired charge rate and enter into program. Start cycling for that channel and then repeat for remaining channels.

When cycling is finished, save the data and calculate the capacity (mAh/g) for charge and discharge and for all cycles.

Once cycling is complete, take cells out of Glove Box. Clean and prepare cells for next experiment.

Note: Use 2 sets of vinyl gloves when dealing with electrolyte.

Example 5

Battery Cathode Properties

Figure 5:
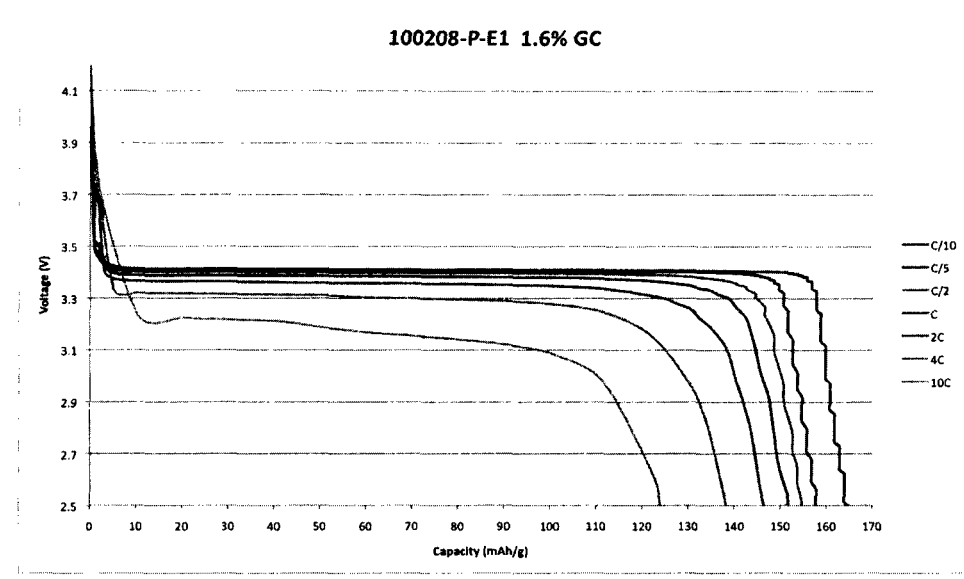
FIG. 5 shows a graph of voltage vs capacity for an electrode material containing 1.6% GC, as described in Example 5.

The test cell is typically tested under what is known as a half-cell configuration with Li metal as anode. Voltages are swept between 2.5V and 4.2V. Currents are constant during a charge and a discharge cycle and are estimated, based on the loading of active material, to give C/10, C/5/C/2, C, 2C, 4C, 8C, 10C, 12C, 16C, etc. In most cases, the charge and discharge for a full cycle are kept at the same current, although it is also possible to charge at a fixed current (often C/2 or C/5) and discharge at the various multiples of C (C=capacity). The results are shown in FIG. 5 for an electrode composition that includes 1.6% GC.

Comparative Example 1

Preparation of Standard Cathode Paste Formulation—without Guanidine Carbonate A similar paste formulation procedure to that described in Example 1 is followed, with the only difference that the guanidine carbonate additive is not included. Then the electrode coating procedure as described in Example 3 is followed. In this case, the coating displays poorer adhesion.

As a reminder, reference to adhesion is often made with respect to the results obtained after hard pressing or calendering. As mentioned above, a simply dried coating may appear to adhere and to have a smooth surface. Although, gentle or no calendering gives apparently uniform, smooth coatings, these coatings often get detached in later test cell assembly and in general, the tape density will be very low, which is undesirable for applications.

Comparative Example 2

Preparation of Cathode Paste Formulation—with Water Drops Addition

A similar paste formulation procedure to that described in Example 1 is followed with the only difference that pure water drops are used instead of Guanidine carbonate solution. Then the electrode coating procedure as described in Example 3 is followed. In this case the coating did not adhere.

Comparative Example 3

Preparation of Cathode Paste Formulation—with Dry Guanidine Carbonate

Figure 6:
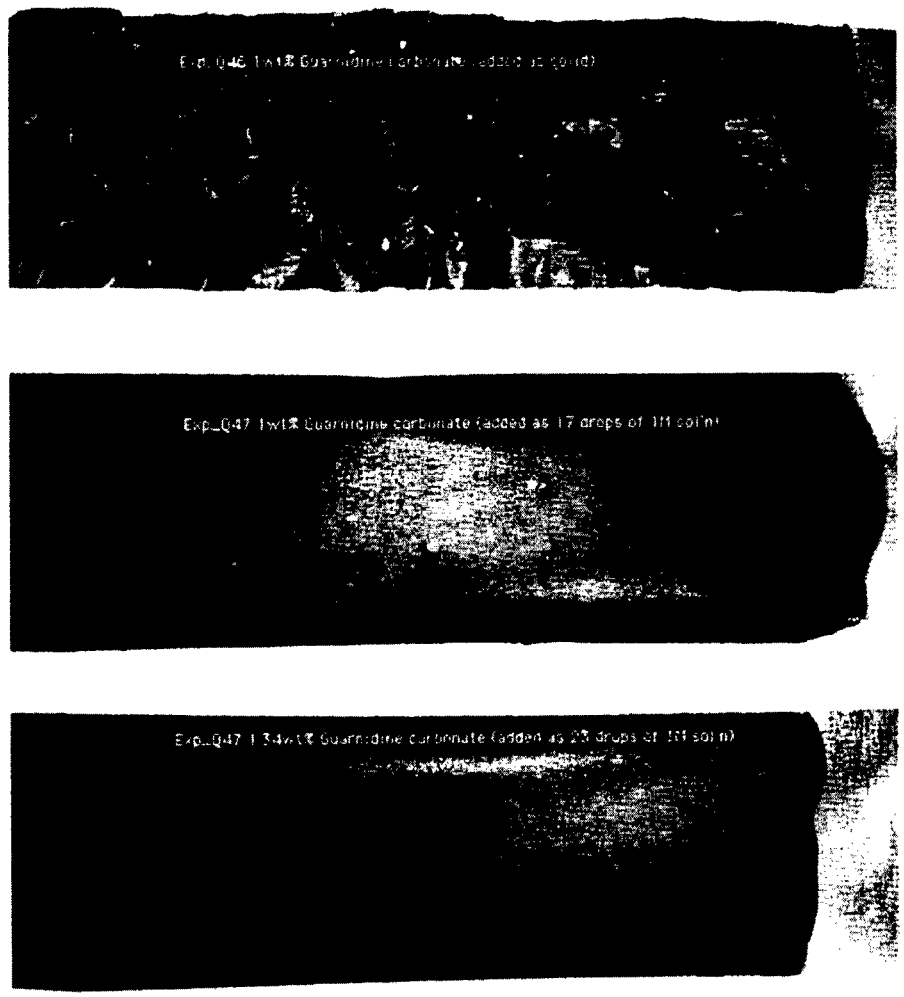
FIG. 6 shows photographs of test electrodes made using an electrode composition having 1% GC added as a solid (top photograph), 1% GC added as a 1M solution (middle photograph) and 134% GC added as a 1M solution (bottom photograph)

A similar paste formulation procedure to that described in Example 1 is followed with the only difference that solid Guanidine carbonate without water is added instead of GC solution. Then the electrode coating procedure as described in Example 3 is followed. In this case the coating did not adhere for 1.3 w % added as solid (see FIG. 6). However, by significantly increasing the weight percentage of dry GC, it is possible to obtain improved adhesion. FIG. 6 shows photographs of test electrodes made using 1% GC added as a solid (top photograph), 1% GC added as a 1M solution (middle photograph) and 1.34% GC added as a 1M solution (bottom photograph). Best adhesion was found with 1.34% GC added as a solution, followed by 1% GC added as a solution, followed by 1% GC added as a solid.

Comparative Example 4

Preparation of Cathode Paste Formulation—with Lower Amount of Guanidine Carbonate A similar paste formulation procedure to that described in Example 1 is followed, with the only difference that a lower amount of guanidine carbonate solution is used. Then the electrode coating procedure as described in Example 3 is followed. In this case, lower amounts of GC (below about 1 wt %) displayed degraded adhesion, roughly in proportion to the reduced amount of GC (see FIG. 6).

Comparative Example 5

Preparation of Cathode Paste Formulation—with LiOH Addition

A similar paste formulation procedure to that described in Example 1 is followed, with the only difference that LiOH solution instead of guanidine carbonate solution is used. The amount of LiOH was estimated to produce a similar pH as that obtained with GC.

Then the electrode coating procedure as described in Example 3 is followed. In this case, the sample displayed good adhesion.

Comparative Example 6

Preparation of Cathode Paste Formulation—with KOH Addition

A similar paste formulation procedure to that described in Comparative Example 5 is followed, with the only difference that KOH solution instead of LiOH solution is used. Then the electrode coating procedure as described in Example 3 is followed. In this case, the sample did not display as good adhesion.

Comparative Example 7

Preparation of Cathode Paste Formulation—without Guanidine Carbonate but with Monarch 1300 Instead of Super P Li A similar paste formulation procedure to that described in Comparative Example 1 is followed, with the only difference that Monarch 1300 is used as the conductive carbon additive instead of Super P Li. Then the Electrode coating procedure as described in Example 3 is followed. In this case, good adhesion is obtained with Monarch 1300, however, electrical and electrochemical properties are inferior.

Comparative Example 8

Preparation of Carbon Pre-Coat on Aluminium Substrate

Make up the following solutions:

| Solution A | |
|---|---|
| LUDOX ® AM-30 suspension (colloidal silica) | 10 g Sigma 420875-4L |
| Solution B | |
| Potassium hydroxide | 0.56 g |
| Water | 10 g |
| Solution C | |
| Water | 5 g |
| 85% $H_3PO_4$ | 1 g |

Add Solution A to Solution B. Stir for 1 minute, then slowly add drop-wise, 85% $H_3PO_4$, waiting 2 minutes between each drop for 11 drops. Check the pH.
Note:
This should drop the pH to approximately 10.4-10.6.
From here use Solution C to slowly reach pH 9.6-10 (don't worry about timing in this part). The solution will gel after a few minutes. Ensure that the final pH is recorded.
Note:
Try and have the pH stable around 10, before the solution gels, otherwise the pH measurement may not be accurate.

Then add 12 g of water and mix thoroughly before adding 1 g SuperP Li.

Break up the gel and blend for about 5 min with high-speed mixer (setting 3) to thoroughly disperse.

To produce a thin coating, set the doctor blade to 5-10 microns on the micrometers. Squirt a small amount of water onto a glass plate and lay an aluminium strip on top of it. Adhere the strip to the glass plate by squeezing out the excess water from underneath with a folded paper towel. Smooth the edges of the Al strips with the cap of a pen.

Then spread sufficient pre-coat material on one end of the strip; place the doctor-blade in front of it, and with a steady continuous movement spread the coating all the way along the strip.

Allow the wet Pre-coat to air dry, then place in a 150° C. oven and dry for at least 1 hour.

Hold down both ends of the strip in place with sticky tape, Then apply lengths of sticky tape to the coated surface, press down firmly.

Peel off tape to remove the loose and excess carbon. Do this twice. The strips are now ready to coat with the Battery Material.

Figure 7:
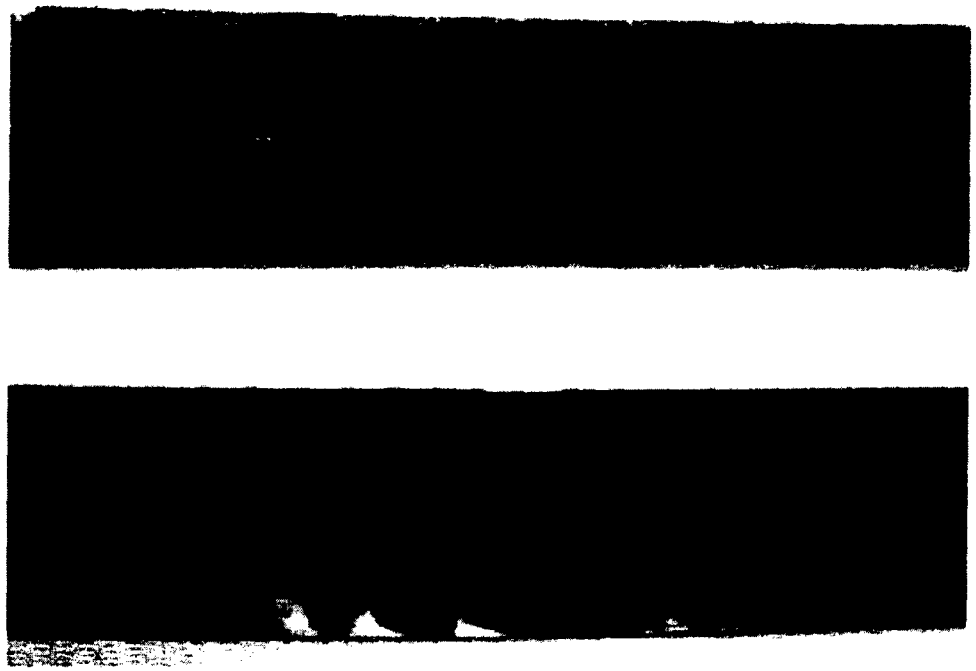
FIG. 7 shows the difference between the carbon pre-coating (bottom photograph) and stripped coating (top photograph), as used in Comparative Example 8.

FIG. 7 shows the difference between the original carbon pre-coating (bottom photograph) and stripped coating (top photograph).

Comparative Example 9

Electrode Coating on Carbon Pre-Coated Aluminium Substrate

A similar electrode coating procedure to that described in Example 3 is followed with the only difference that carbon pre-coated aluminium is used instead of bare aluminium.

When using super P Li in the pre-coat and in the cathode paste formulation, properties nearly as good as those with the method of the invention here were obtained. However, since the carbon pre-coat is somewhat sensitive to the peel off of loose particles, the reproducibility of the GC method was superior. The carbon pre-coated substrate often had small, local inhomogeneities, probably as a result of the difficulty in mixing once the intermediate carbon pre-coat paste gels up.

Comparative Example 10

Electrode Coating on Carbon Pre-Coated Aluminium substrate

In order to test the effect on performance further various combinations of Monarch 1300 and Super P Li in the carbon pre-coat and in the paste formulation were produced as described in Comparative example 9 with the corresponding type of carbon. Results are summarized in the following table:

TABLE

| Sample | Pre-coat carbon | Paste mix carbon | Electrical properties |
| --- | --- | --- | --- |
| Example 9 | Super P Li | Super P Li | Low impedance, good discharge platform |
| Example 10a | Super P Li | Monarch 1300 | Higher impedance, poorer discharge platform |
| Example 10b | Monarch 1300 | Super P Li | Higher impedance, poorer discharge platform |
| Example 10c | Monarch 1300 | Monarch 1300 | Much higher impedance, significantly poorer discharge platform |

Comparative Example 11

Anode Manufacture without Guanidine Carbonate

In this example, Super P Li (0.2 g) was mixed into NMP (15.82 g) using a high speed mixer for 1 min. Cpreme graphite G5 (9.2 g) was then mixed into this solution also using a high speed mixer for 1 min. This mixture was then added to a slurry of NMP (5.25 g)+PVDF (0.6 g) that had been high speed mixed for 1 min. This final slurry was mixed using a Planar mixer for 20 mins. Electrodes were then coated using a doctor blade method onto Copper foil substrate at varying settings and dried on a hot plate at 105° C.

After pressing the electrodes using a roll press, all electrodes delaminated and failed.

Example 12

Anode Manufacture with 1.74% wt Guanidine Carbonate

In this example, PVDF (0.6 g) was dissolved into NMP (21 g) using high speed mixing. Super P Li (0.2 g) was then added to this solution and high speed mixed for 1 min. Cpreme G5 Graphite (9.2 g) was then added using a Planar mixer for 1 hr. 1M Guanidine Carbonate (0.51 g) was then added to final solution and planar mixed for another 1 hr. Electrodes were then coated using a doctor blade method onto a copper foil substrate at varying settings and dried on a hot plate at 110° C.

After pressing the electrodes using a roll press, the adhesion of the material onto the copper foil showed significant improvement from Comparative Example 11.

Example 13

Cathode Manufacture with 1.74% wt Guanidine Carbonate Using Reduced Mixing Times In this example, PVDF (0.5 g) was dissolved into NMP (21 g) using high speed mixing. Super P (0.5 g) was then added to this solution and high speed mixed for 1 min. Active material (9.0 g) was then added using a Planar mixer for 5 mins. 1.74 wt % of 1M Guanidine Carbonate (0.54 g) was then added to final solution and planar mixed for another 5 mins. Electrodes were then coated using a doctor blade method onto aluminium foil substrate at varying settings and dried in oven at 120 C using a slow temperature increase (Approx 1 hr→120° C., 30 mins at 120° C.).

Excellent adhesion on the electrode was seen after roll pressing.

Example 14

Cathode Manufacture with 1.74% wt Guanidine Carbonate Using Reduced Mixing Times In this example, PVDF (0.5 g) was dissolved into NMP (21 g) using high speed mixing. Super P Li (0.5 g) was then added to this solution and high speed mixed for 1 min. Active material (9.0 g) was then added using a Planar mixer for 2 hrs. 1.74 wt % of 1M Guanidine Carbonate (0.54 g) was then added to final solution and planar mixed for another 5 mins. Electrodes were then coated using a doctor blade method onto Aluminium foil substrate at varying settings and dried in oven at 120 C using a slow temperature increase (Approx 1 hr→120° C., 30 mins at 120° C.).

Excellent adhesion on the electrode was seen after roll pressing.

Example 15

Excellent adhesion of active material pastes can also be achieved by air brush coating of GC solutions onto aluminium substrates according to the following procedure:

A specific concentration of GC solution (e.g. 1M) is loaded into a gravity fed air bush.

Atomisation is optimised so as to minimise beading of the solution when sprayed onto aluminium foil.

A single layer of the GC solution is spray coated onto an aluminium foil substrate. The active material paste is then immediately doctor blade coated over the wet GC film.

Film is dried according to normal procedure

Those skilled in the art will appreciate that the present invention may be susceptible to variations and modifications other than those specifically described. It will be understood that the invention encompasses all such variations or modifications that fall within its spirit and scope. The invention also extends to all combinations of features described herein.

What is claimed is:

1. A battery electrode for a lithium ion battery comprising an electrically conductive substrate having an electrode layer thereon, wherein the electrode layer includes highly alkaline organic material which comprises a guanidinium compound, wherein the organic material is incorporated into the electrode layer as a solution of the organic material dissolved in water.

2. A battery electrode as claimed in claim 1, wherein the battery electrode comprises an anode.

3. A battery electrode as claimed in claim 1, wherein the battery electrode comprises a cathode.

4. A battery electrode as claimed in claim 1, the electrode layer comprises a material that intercalates lithium.

5. A battery electrode as claimed in claim 1, wherein the electrode layer further comprises a binder and a solvent.

6. A battery electrode as claimed in claim 1, wherein the electrode layer further comprises a conductive particulate material.

7. A battery electrode for a lithium ion battery comprising an electrically conductive substrate having an electrode layer thereon, wherein the electrode layer includes highly alkaline organic material which comprises a guanidinium compound, wherein the guanidinium compound comprises guanidine carbonate.

8. A battery electrode as claimed in claim 7, wherein the guanidine carbonate is present in an amount of from 0.3% to 2.0% by weight of the electrode layer.

9. A battery electrode for a lithium ion battery comprising an electrically conductive substrate having an electrode layer applied thereto, wherein the electrode layer includes an organic material having high alkalinity, or an organic material having an imide group(s) and aminoacetal group(s), or an organic material that strongly chelates or bonds with a metal substrate and/or chelates or bonds with an active material in the electrode layer, wherein the organic material is incorporated into the electrode material as a solution of the organic material dissolved in water.

10. A method for forming a battery electrode for a lithium ion battery comprising an electrically conductive substrate having an electrode layer applied thereto, wherein the electrode layer includes an organic material having high alkalinity, or an organic material having an imide group(s) and aminoacetal group(s), or an organic material that strongly chelates or bonds with a metal substrate and/or chelates or bonds with an active material in the electrode layer, wherein the method comprises applying the organic material to the substrate and subsequently forming the electrode layer on the substrate.

11. A method of forming a battery electrode for a lithium ion battery, which method comprises:
 applying a composition to a substrate and allowing or causing the composition to bind to the substrate to form an electrode layer; the composition comprising a lithium containing compound that provides a lithium ion source in the battery; a binder; a solvent; a conductive particulate material; and an organic material having high alkalinity;
 wherein the applying of the composition comprises applying the organic material to the substrate and subsequently forming the electrode layer on the substrate.

12. A method of forming a battery electrode for a lithium ion battery, which method comprises:
 applying a composition to a substrate and allowing or causing the composition to bind to the substrate to form an electrode layer; the composition comprising a lithium containing compound that provides a lithium ion source in the battery; a binder; a solvent; a conductive particulate material; and an organic material having high alkalinity;
 wherein the method comprises incorporating the organic material into the electrode layer by dissolving the organic material in water.

13. The method of claim 12, wherein the organic material comprises a guanidinium compound.

14. The method as claimed in claim 13, wherein the guanidinium compound comprises guanidine carbonate.

* * * * *